Patented Mar. 2, 1937

2,072,249

UNITED STATES PATENT OFFICE 2,072,249

MANUFACTURE OF CELLULOSE DERIVATIVES

Henry Dreyfus, London, England

No Drawing. Application May 22, 1934, Serial No. 726,953. In Great Britain May 26, 1933

11 Claims. (Cl. 260—101)

This invention relates to improvements in the manufacture of cellulose derivatives, and particularly to processes whereby cellulosic materials are rendered more reactive towards subsequent treatments, especially acetylation or other esterification, and to the production of cellulose acetate and other cellulose derivatives from the treated materials.

In order to render cellulosic materials reactive to esterification or other process for the production of cellulose derivatives, it is desirable to subject them to a pre-treatment with suitable reagents. Thus, the materials may be treated with acetic or formic acid or other organic acid in liquid or vapour form, by which means their reactivity may be improved, and such acid may contain one or more mineral acids, preferably in small proportions.

I have now discovered that by pretreating cellulosic materials with an organic acid containing sulphuric acid or other mineral acid, and then partially or wholly neutralizing the mineral acid before proceeding with the manufacture of the cellulose derivative the materials may be rendered reactive and at the same time the temperature conditions prevailing during the manufacture of the cellulose derivative may be better controlled, so that improved products may be obtained.

While the process of the present invention may be employed in the pretreatment of cellulosic materials prior to their conversion into any cellulose derivatives, it is particularly valuable in connection with the manufacture of cellulose acetate and other cellulose esters and will therefore be described with particular reference thereto. The esterifying agent employed in a subsequent esterification is preferably an organic acid anhydride, but any other suitable esterifying agent may be employed if desired.

The process of the present invention may be applied to any suitable cellulosic materials, for example cotton linters, or wood pulps or the like from which the lignin, pentosan, resin and similar constituents have been substantially removed, as for example in sulphite pulp, soda pulp or sulphate pulp. In the case of treatment of such wood pulps and similar materials, the materials are preferably subjected to an alkaline purifying treatment, such, for example, as is described in U. S. Patent No. 1,711,110, prior to pretreatment according to the process of the present invention. Such alkaline purifying treatment may, for example, be effected with caustic alkali of relatively low concentration such as 3% or less at relatively elevated temperatures, or in the cold or with only slight heating with caustic alkali of higher concentration, for example 15 or 20%.

Again, cellulosic materials obtained by the treatment of ligno-cellulosic materials with alkali and sulphur dioxide as described in U. S. application S. No. 680,251 filed 13th July, 1933 may be treated according to the present invention.

Any suitable organic acid may be employed in the organic acid pretreatment according to the present invention, but lower fatty acids and especially formic acid and acetic acid are particularly valuable. The pretreatment may be carried out with the organic acid in liquid form, for example by spraying the materials with a mixture of the organic acid and mineral acid or by soaking them in such a mixture, or, when a sufficiently volatile mineral acid is employed, for example hydrochloric acid, the materials may be treated with the mixture of organic and mineral acids in vapour form.

The mineral acid which is most valuable for the purpose of the present invention is sulphuric acid, but the invention is not limited thereto and other mineral acids, for example hydrochloric acid, phosphoric acid and perchloric acid may also be employed, or mixtures of any suitable mineral acids, for example any of those mentioned above. The mineral acid or acids employed in the pretreatment is preferably the same as that used as catalyst in the subsequent esterification process, but if desired different acids may be employed for the pretreatment and esterification processes. The proportion of mineral acid employed in the pretreatment process is preferably small, compared with the proportion employed in a normal esterification process using such acid as catalyst. Thus in the case of sulphuric acid proportions up to about 5% and particularly of ½ to 1 or 2% on the weight of the cellulosic material are very suitable. Higher proportions may be employed if desired, but in general proportions of acid which are considerably less than those employed in an esterification process are preferable.

The pretreatment with the mixture of organic and mineral acids may be carried out either in the cold or with heating, and the acids may be employed in either a concentrated or a dilute form. In general the more concentrated the acids the lower may be the temperature of pretreatment, and it is found that it is preferable to employ concentrated or relatively concentrated acids at approximately normal temperatures without heating. Any suitable concentration of mineral acid in the organic acid may be employed, for example a concentration of 10, 15 or 20% or more, but, in general, relatively low concentrations are preferable, for example a concentration of about 2-5%. The duration of the pretreatment will depend upon the type of cellulosic material treated, the mineral and organic acids employed, the concentration and quantity of such acids and other factors, but, in general, at temperatures of about 20°–30° C., employing sulphuric and acetic acids, a treatment of about 4–6 hours is very suitable.

After the pretreatment the organic acid may be removed before the esterification process or the cellulosic material containing the organic acid may be esterified directly. When formic acid is used in the pretreatment, it is preferably removed prior to esterification, except when it is desired to manufacture cellulose formate, for example by passing a current of air through the material, while after pretreatment with acetic acid the cellulosic material may be esterified without removal of such acid.

After completion of the pretreatment the mineral acid employed in the pretreatment is partially or completely neutralized in any suitable manner. Preferably about 80-90% of the mineral acid is neutralized. Thus an alkaline substance, for example ammonia, or an organic base, e. g. an alkylamine, may be vaporized through or otherwise incorporated with the material so as to neutralize the mineral acid, or the salt of a weak acid may be incorporated with the cellulosic material for the same purpose. Sodium acetate is an example of a salt which is particularly valuable for this purpose, while examples of other suitable salts are sodium carbonate and bicarbonate. Such a salt may be incorporated with the material in any suitable manner, e. g. dissolved in a suitable solvent. Preferably a solvent which will not react with or destroy the anhydride or other reagents employed in the esterification process is used.

A very suitable medium for incorporating the substance employed to react with the mineral acid is the liquid which serves as solvent or diluent in the subsequent esterification process. Thus when the cellulosic material is to be employed in the manufacture of cellulose acetate in the presence of acetic acid, such acid may be used as the medium for the sodium acetate or other substance employed in neutralizing the mineral acid. Any suitable quantity of acetic acid or other liquid may be employed for such purpose. Thus relatively small amounts may be used, or the whole or a substantial proportion of the acetic acid or other solvent or diluent to be employed in the subsequent esterification.

If the acetic acid or other liquid contains water, acetic or other anhydride may also be incorporated in order to destroy such water.

In carrying out the above operations precautions should be taken to avoid any substantial rise of temperature due, e. g. to reaction between acetic anhydride and water. For example, when the mineral acid employed is sulphuric acid it is preferable that the temperature should not rise above about 35–35° C. Thus incorporation of the acetic acid and/or anhydride may be carried out slowly, either continuously or in small quantities, and strong cooling may be employed to assist in maintaining the temperature suitably low, or the acetic anhydride, if used, may be mixed with the acetic acid prior to its incorporation with the cellulosic material.

After pretreatment and neutralization or partial neutralization of the mineral acid with or without removal of the organic acid, the manufacture of the cellulose derivative may be effected by any suitable method. Thus in the production of cellulose acetate, the cellulosic materials may be esterified by means of acetic anhydride and sulphuric acid in the presence of acetic acid. Esterification may be effected so that the cellulose ester is obtained in solution, or, alternatively, the cellulose ester may be obtained in suspension by the use of relatively large proportions of a suitable diluent in which the cellulose ester is insoluble, for example benzene, toluene or other aromatic hydrocarbon, in the case of cellulose acetate and other lower fatty acid esters.

While, as stated above, the pretreatment is effected in the presence of a mineral acid, and the same mineral acid is preferably also employed for the esterification process, the invention is by no means limited to the use of mineral acids as catalysts for the esterification, and other catalysts may be employed if desired, for example sulphuryl chloride, sodium perchlorate and other perchlorates, bisulphates, for example sodium bisulphate and ferric chloride or other ferric halide, preferably in conjunction with the corresponding hydrohalide acid. When esterification is carried out in the presence of a salt, such salt may be formed by the neutralization of the acid employed in the pretreatment. For example, when hydrochloric acid is employed in the pretreatment it may be neutralized with ferric oxide or ferric acetate, and the ferric chloride produced may form part or the whole of the catalyst employed in a subsequent esterification.

The esterification may be carried out so as to obtain cellulose esters of any desired viscosity. Thus by allowing the temperature to rise during the esterification, e. g. to 50°–60° C. when using sulphuric acid as the catalyst, esters of relatively low viscosity suitable for lacquer bases may be obtained, while by carrying out the esterification in the presence of a large quantity of acetic acid or other solvent, or of a suitable diluent, e. g. benzene or toluene, for example a proportion of 600%, 800%, or more on the weight of the cellulosic material, esters of very high viscosity may be obtained, as described in U. S. Patent No. 1,708,787.

The following examples are given in order to illustrate the invention, but they do not limit it in any way:—

*Example 1*

Cotton linters are sprayed in a suitable vessel with a mixture of glacial acetic acid and sulphuric acid, the amount of the mixture being such that the sulphuric acid employed is equal to about 2% by weight of the cotton linters. After standing with occasional turning at about normal temperature for 4–6 hours, the cotton linters are introduced into an acetylator containing the glacial acetic acid required for the subsequent acetylation process and containing sufficient sodium acetate to neutralize 80–90% of the sulphuric acid to sodium sulphate. After neutralization the necessary acetic anhydride is introduced and subsequently the sulphuric acid employed as catalyst is added and acetylation is carried out in the normal manner.

Example 2

A mixture of acetic acid and hydrogen chloride is vaporized into cotton linters until they contain a proportion of hydrogen chloride equal to about 5-10% of their weight. They are then allowed to stand for about 6-8 hours at a temperature of 20°-25° C., after which sufficient ammonia is vaporized into the materials to neutralize about 90% of the hydrochloric acid. The cotton linters may then be treated in any suitable manner for the production of a cellulose derivative, for example they may be acetylated by means of acetic anhydride in the presence of acetic acid using sulphuric acid or ferric chloride and hydrochloric acid as catalyst.

The primary cellulose esters obtained according to the present invention may be used as such for technical purposes or they may be first submitted to a ripening process in order to modify their solubility characteristics. Such ripening process may be effected either in the primary esterification solutions or the cellulose esters may be treated after removal from the esterification solution. Thus on completion of the esterification, water or other suitable reagent may be introduced in the solution to destroy excess anhydride or other esterifying agent and the solution may then be allowed to stand either at ordinary temperatures or at increased temperatures and with or without altering the concentration of catalyst until the required solubility is obtained. In this connection reference is made to British Patents Nos. 20,977/11 and 20,852/12 and U. S. Patent No. 1,217,122, which describe in detail processes for the ripening of primary cellulose acetates or other cellulose esters. Ripening may, if desired, be effected in more than one stage, particularly when sulphuric acid is employed as catalyst, for example by destroying the excess esterifying agent and, if desired, partially neutralizing the catalyst, allowing the esterification mixture to stand for a time and then adding a further quantity of water or other ripening agent.

The process of the present invention is of particular value in connection with the production of cellulose acetate since this is the cellulose derivative which is of the greatest commercial value, but it may also be applied to the production of any other cellulose esters and mixed esters, for example cellulose formate, cellulose propionate, cellulose butyrate, cellulose laurate, cellulose benzoate, cellulose acetate-propionate and cellulose nitro-acetate.

Further, while, as stated above, the process of the present invention is of particular value in relation to the pretreatment of cellulosic materials for the production of cellulose acetate or other cellulose ester, cellulosic materials pretreated according to the process of the present invention may also be employed in the production of other cellulose derivatives, for example ethyl, methyl, butyl and benzyl cellulose and other cellulose ethers and mixed ethers.

The cellulose derivatives obtained according to the present invention may be employed for any industrial purpose, e. g. in the manufacture of textile materials, foils, lacquers and plastics.

What I claim and desire to secure by Letters Patent is:—

1. In a process for the manufacture of an organic ester of cellulose with the aid of an organic acid anhydride the steps of pretreating cellulose with a medium comprising a lower fatty acid and a small proportion of a strong mineral acid, at least partially neutralizing the mineral acid and admixing the pretreated cellulose with the said anhydride under such conditions that no substantial rise in temperature occurs, and proceeding with the esterification process in the presence of a catalyst comprising said mineral acid.

2. In a process for the manufacture of an organic ester of cellulose with the aid of an organic acid anhydride the steps of pretreating cellulose with a medium comprising a lower fatty acid and a small proportion of a strong mineral acid, at least partially neutralizing the mineral acid and admixing the pretreated cellulose with the said anhydride under such conditions that no substantial rise in temperature occurs and finally adding an esterification catalyst comprising said mineral acid.

3. In a process for the manufacture of an organic ester of cellulose with the aid of an organic acid anhydride the steps of pretreating cellulose with a medium comprising a lower fatty acid and a small proportion of a strong mineral acid, at least partially neutralizing the mineral acid and admixing the pretreated cellulose with the said anhydride under such conditions that no substantial rise in temperature occurs and finally adding an esterification catalyst comprising a proportion of said mineral acid larger than that present during pretreatment.

4. In a process for the manufacture of a lower fatty acid ester of cellulose, the steps of pretreating cellulose with a medium comprising a lower fatty acid and sulphuric acid, the amount of sulphuric acid being at the most 5% of the weight of the cellulose, at least partially neutralizing the sulphuric acid and admixing the pretreated cellulose with a lower fatty acid anhydride in the presence of the lower fatty acid as diluent under such conditions that no substantial rise in temperature occurs, and finally adding an esterification catalyst comprising a proportion of sulphuric acid larger than that present during the pretreatment.

5. In a process for the manufacture of a lower fatty acid ester of cellulose, the steps of pretreating cellulose with a medium comprising a lower fatty acid and sulphuric and phosphoric acids, the amount of sulphuric and phosphoric acids being at the most 5% of the weight of the cellulose, at least partially neutralizing the mineral acids and admixing the pretreated cellulose with a lower fatty acid anhydride in the presence of the lower fatty acid as diluent under such conditions that no substantial rise in temperature occurs, and finally adding an esterification catalyst comprising a proportion of sulphuric acid and phosphoric acid larger than that present during the pretreatment.

6. In a process for the manufacture of cellulose acetate, the steps of pretreating cellulose with a medium comprising a lower fatty acid and a small proportion of a strong mineral acid, at least partially neutralizing the mineral acid and admixing the pretreated cellulose with acetic anhydride under such conditions that no substantial rise in temperature occurs, and finally adding an esterification catalyst comprising said mineral acid.

7. In a process for the manufacture of cellulose acetate, the steps of pretreating cellulose with a medium comprising acetic acid and a small proportion of sulphuric acid, at least partially neutralizing the sulphuric acid and admixing the pretreated cellulose with acetic anhydride under such conditions that no substantial rise in temperature occurs, and finally adding an esterification catalyst comprising sulphuric acid.

8. In a process for the manufacture of cellulose acetate, the steps of pretreating cellulose with a medium comprising acetic acid and sulphuric acid, the amount of sulphuric acid being at the most 5% of the weight of the cellulose, neutralizing from 80–90% of the sulphuric acid and admixing the pretreated cellulose with acetic anhydride in the presence of acetic acid as diluent under such conditions that no substantial rise in temperature occurs, and finally adding an esterification catalyst comprising a proportion of sulphuric acid larger than that present during the pretreatment.

9. In a process for the manufacture of cellulose acetate, the steps of pretreating cellulose with a medium comprising acetic acid and sulphuric and phosphoric acids, the amount of mineral acids being at the most 5% of the weight of the cellulose, neutralizing from 80 to 90% of the mineral acids and admixing the pretreated cellulose with acetic anhydride in the presence of acetic acid as diluent under such conditions that no substantial rise in temperature occurs, and finally adding an esterification catalyst comprising a proportion of sulphuric and phosphoric acids larger than that present during the pretreatment.

10. In a process for the manufacture of cellulose acetate, the steps of pretreating cellulose with a medium comprising a lower fatty acid and a quantity of sulphuric acid equal to ½ to 2% of the weight of the cellulose, neutralizing from 80 to 90% of said sulphuric acid and admixing the pretreated cellulose with acetic anhydride under such conditions that no substantial rise in temperature occurs, and finally adding an esterification catalyst comprising sulphuric acid.

11. In a process for the manufacture of cellulose acetate, the steps of pretreating cellulose with a medium comprising acetic acid and a quantity of sulphuric acid equal to ½ to 2% of the weight of the cellulose, neutralizing from 80 to 90% of said sulphuric acid and admixing the pretreated cellulose with acetic anhydride in the presence of acetic acid as diluent under such conditions that no substantial rise in temperature occurs, and finally adding an esterification catalyst comprising a proportion of sulphuric acid larger than that present during the pretreatment.

HENRY DREYFUS.

CERTIFICATE OF CORRECTION.

Patent No. 2,072,249. May 2, 1937

HENRY DREYFUS.

It is hereby certified that error appears in the printed specification of the above numbered patent requiring correction as follows: Page 2, first column, line 71, for "35-35° C" read 30-35° C; and that the said Letters Patent should be read with this correction therein that the same may conform to the record of the case in the Patent Office.

Signed and sealed this 30th day of March, A. D. 1937.

(Seal)

Henry Van Arsdale
Acting Commissioner of Patents.

CERTIFICATE OF CORRECTION.

Patent No. 2,072,249. March 2, 19.

HENRY DREYFUS.

It is hereby certified that in the Certificate of Correction issued Mar 30, 1937 in the above numbered patent, the date of patent in the upper right hand corner thereof should appear as March 2, 1937 instead of "May 2, 1937 and that the said Certificate should be read with this correction therein that the same may conform to the record of the case in the Patent Office.
Signed and sealed this 20th day of April, A. D. 1937.

(Seal)

Henry Van Arsdale
Acting Commissioner of Patents.